April 5, 1949.     T. E. SIERER, JR     2,466,055
ROTARY SIGNAL PICKOFF CONTROL MEANS
Filed May 15, 1946     2 Sheets-Sheet 2
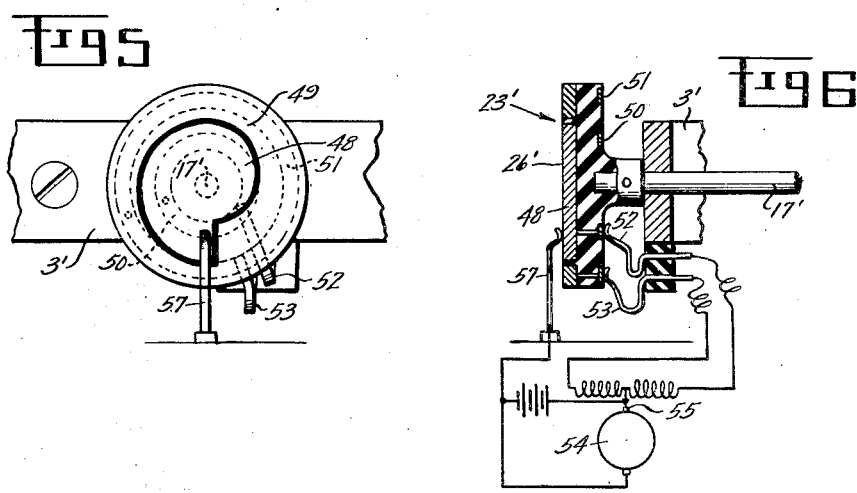
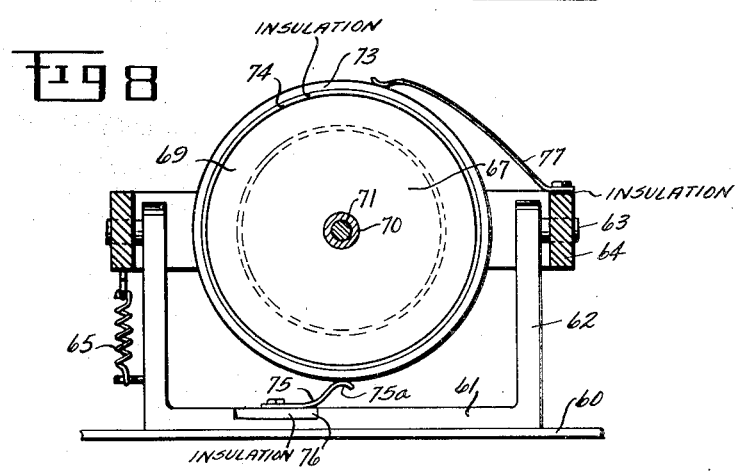
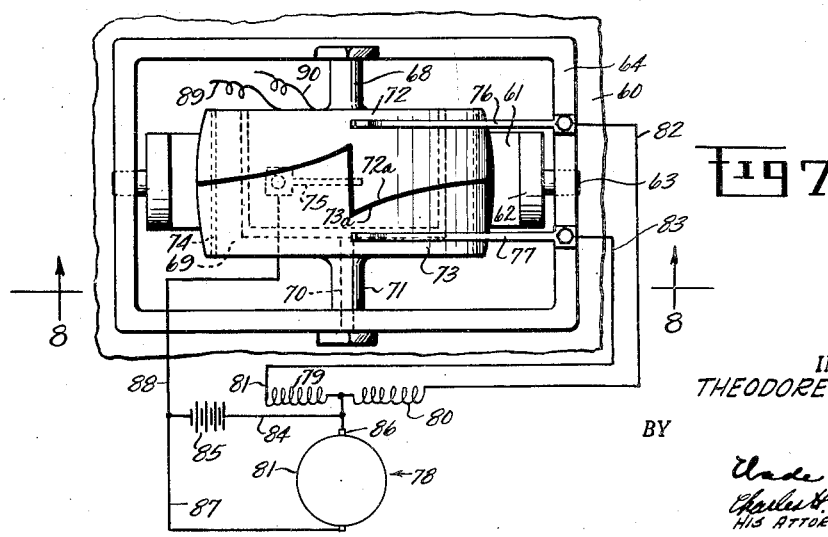
INVENTOR.
THEODORE E. SIERER JR.
BY
HIS ATTORNEYS Patented Apr. 5, 1949

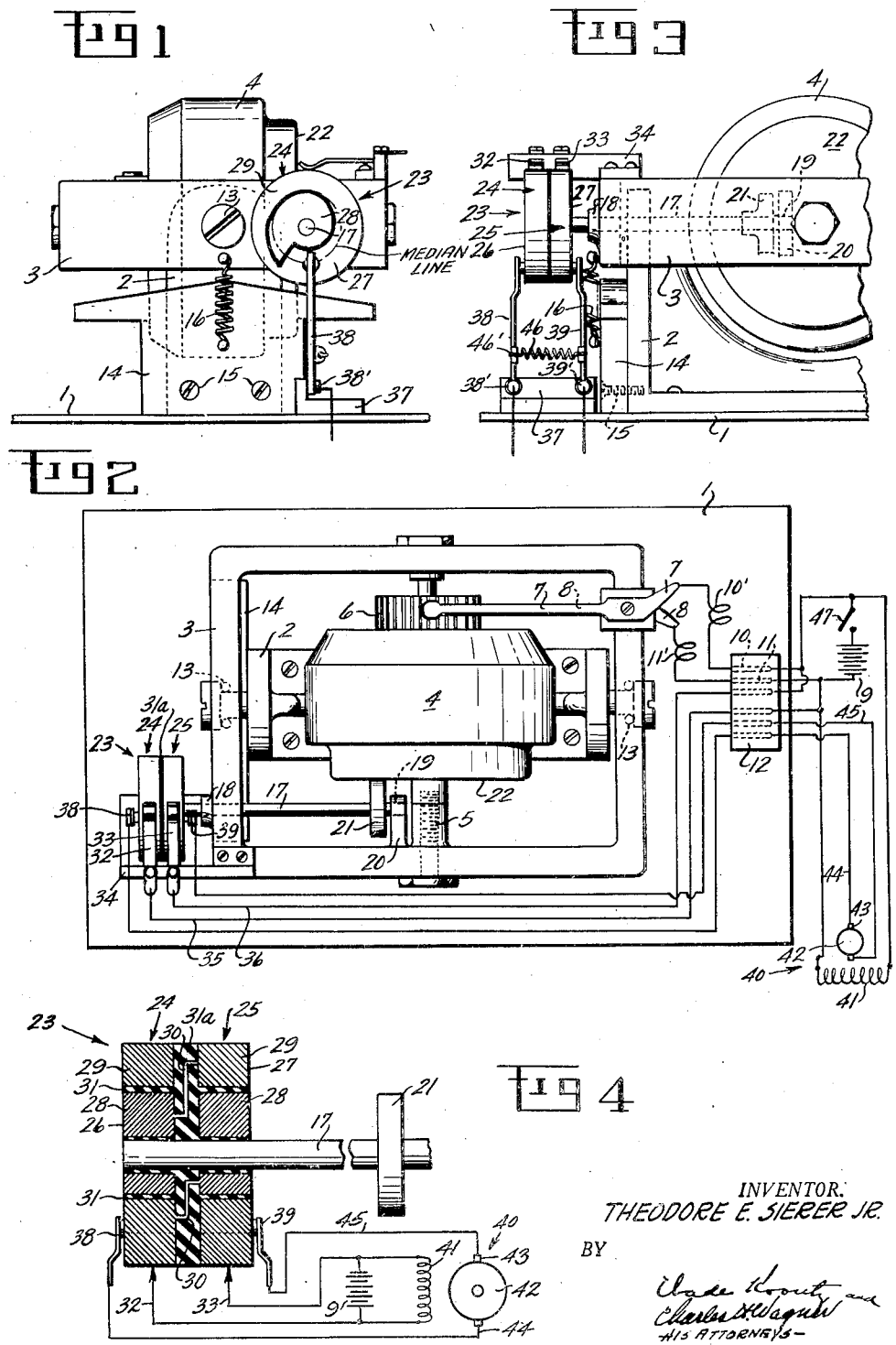

2,466,055

UNITED STATES PATENT OFFICE 2,466,055

ROTARY SIGNAL PICK-OFF CONTROL MEANS

Theodore E. Sierer, Jr., Dayton, Ohio

Application May 15, 1946, Serial No. 669,774

15 Claims. (Cl. 200—52)

(Granted under the act of March 3, 1883, as amended April 30, 1928; 370 O. G. 757)

The invention described herein may be manufactured and used by or for the Government for governmental purposes without payment to me of any royalty thereon.

This invention relates to navigational instruments, and more particularly to gyroscope controlled rotary signal pick-off control means for controlling the operation of an electric reversible servo-motor under the control of a gyroscope device, for controlling the direction of flight, or rate of turn of a small aircraft, such as a remotely controlled target airplane.

An object of the invention is the provision of improved high speed rotary electrical current reversing control means in the form of a gyroscope device for very rapidly alternately reversing the current flow in an electrical control circuit and varying the duration of the current flow in the control circuit in one direction relative to the duration of the current flow in the opposite direction in predetermined ratio to the displacement or precession of the gyroscope device, so that the aggregate current flow in the electrical circuit in one direction relative to the aggregate current flow in the opposite direction is in a predetermined ratio to the displacement of the gyroscope device.

A further object of the invention is the provision of a high speed rotary electrical current reversing switch means for alternately varying the duration of current flow in one direction relative to the duration of current flow in the reverse direction during each rotation of the switch means, so that the total current flow in one direction, during continuous rotation of the switch means, is varied in a predetermined ratio to the total current flow in the reverse direction.

A still further object is the provision of a gyroscope actuated electric current flow reversing device for controlling the amount of current flow in an electrical control circuit in one direction with respect to the amount of current flow in the same circuit in the reverse direction in a predetermined ratio to the degree of tilt of the gyroscope device.

A still further object is the provision of a gyroscope control device having a tiltably gimballed rotor for controlling the direction and duration of current flow in an electrical control circuit in opposite directions for controlling the operation of a reversible servo-motor device, said device including high speed current reversing switch means constituting a cooperating part of the gyroscope rotor device for alternately reversing the direction of current flow during each rotation of the switch device by the gyroscope rotor at least once during each rotation of the rotary switch device so that the aggregate current flow in the control circuit in one direction, with respect to the aggregate of current flow in the reverse direction for any given time period, during the rotation of the gyroscope rotor, is in a predetermined ratio to the degree of tilt of the gyroscope rotor.

A still further object is the provision of a gyroscope control device for energizing an electrical reversible servo-motor control circuit in which a gimballed gyroscope rotor is provided having rotary switch means operated thereby for alternately reversing the current flow in the reversible servo-motor control circuit at least once during each rotation of the rotor to produce a series of successive high speed current reversals in the control circuit and varying the duration of each current flow period with respect to the succeeding flow period in predetermined ratio to the degree of tilt of the gyroscope rotor spin axis and its gimbal.

Other objects and advantages of the invention will become apparent from the following description taken in connection with the accompanying drawings in which like reference characters refer to like parts in the several figures.

Fig. 1 is an end elevation of a rate gyroscope device having my improved rotary electrical circuit controlling pick-off switch means incorporated therein.

Fig. 2 is a top plan view of the improved gyroscope control device as seen in Fig. 1.

Fig. 3 is a side view of the gyroscope control device shown in Figs. 1 and 2, parts being broken away.

Fig. 4 is an enlarged vertical sectional view through the rotary circuit controlling switch contact member employed in the construction shown in Figs. 1 to 3, parts being broken away and a servo-motor operating electrical control circuit is schematically illustrated in this figure.

Fig. 5 is a fragmentary end view, somewhat enlarged, showing a slightly modified form of rotary switch or contact member.

Fig. 6 is a vertical sectional view through the rotary switch contact member illustrated in Fig. 5, and a servo-motor electrical control circuit is schematically shown in this figure of the drawings.

Fig. 7 is a top plan view of modified form of the invention, disclosing the servo-motor circuit energizing controlling switch or contact means mounted directly on the gyroscope rotor. A schematic showing of a servo-motor control circuit is incorporated in this figure of the drawings.

Fig. 8 is vertical sectional view through the modified form of the invention disclosed in Fig. 7 and taken in the plane indicated by line 8—8 in Fig. 7.

Referring more particularly to Figs. 1 to 4 of the drawings, the reference numeral 1 indicates a support or base member adapted to be carried by an aircraft or other movable carrier member, the relative level position or change in attitude of the aircraft is adapted to change the position angle of the support. The support 1, as shown in the drawing, has a U-shaped bracket formed with spaced upstanding supporting arms or standards 2—2 on which a gimbal frame 3 is tiltably journalled. An electrically driven gyroscope rotor 4 is journalled in the gimbal frame 3 to rotate about a fixed axis on a post 5 secured in the gimbal frame to dispose the spin axis of the gyroscope rotor in a plane passing through the gimbal frame tilt axis and preferably parallel to the support 1 when the gimbal frame is level. The gyroscope rotor 4 is preferably of the exterior rotating armature type, with a permanent or stationary interior magnet element. Electrical current is supplied to the rotating armature or gyroscope rotor by a commutator 6 through brushes 7 and 8, from an electrical energy source such as a battery 9 connected to terminals 10 and 11 in a terminal block 12 that is secured on the upper face of the supporting frame or base 1. Flexible conductors 10' and 11' connect the terminals 10 and 11 with the brushes 7 and 8 and the two commutator contact brushes 7 and 8 are secured on the gimbal frame 3 in relatively spaced insulated relation to each other and furnish the electrical current to the gyroscope rotor 4 for rotating the same on its supporting post 5.

Suitable anti-friction bearings 13—13 are preferably provided between the gimbal frame 3 and the gimbal frame supporting standards 2 to allow the gimbal frame to tilt freely. A tilting limit or stop plate 14 is secured to the face of one of the vertical standards 2 by suitable fastenings 15, best seen in Figs. 1, 2 and 3, the oppositely extending arms of the stop member 14 being disposed to limit the tilting movement of the gimbal frame about its tilt axis.

A light stabilizing spring 16 is connected between the center of the gimbal frame and the stop plate, directly below the gimbal frame tilt axis, to normally maintain the gimbal frame in relative level position with respect to the base and yieldably resist the relative tilting action of the gimbal frame by the gyroscopic action of the rotor when the base is tilted, or when the base is adjusted about a vertical axis, the spring functioning to determine the rate of tilt of the gyroscope spin axis relative to the angular or rotative adjustment of the support.

A drive shaft 17 is suitably journalled in aligned bearings 18 and 19 formed in the gimbal frame 3 and in an inwardly extending bracket arm 20 carried on the gimbal frame with the axis of the shaft 17 disposed in laterally offset parallel relation to the tilt axis of the gimbal frame. The inner end of the drive shaft 17 has a friction drive disc 21 secured thereon with its periphery in frictional contact with a friction face 22 on the gyroscope rotor 4, the opposite end of the drive shaft 17 projecting through and beyond the gimbal frame 3 with an annular circuit reversing rotary switch contact member secured thereon, indicated generally at 23. The contact member 23, as seen in Fig. 4, comprises two axially spaced contact discs 24 and 25 having axially spaced parallel contact faces 26 and 27, each disc including an inner contact member 28 and an outer or surrounding contact member or plate 29, the outer contact member or plate 29 of the disc 24 being electrically connected by a conductor 30 to the inner contact member or plate 28 of the disc 25 while the outer contact member or plate 29 of the disc 25 is connected by an electrical conductor 31 to the inner contact member or plate 28 of the disc 24, the two discs 24 and 25 being insulated from each other, except for the electrical conductors 30 and 31 between the two inner contact plates 28—28 and the two outer contact plates 29—29.

The shape or peripherial contours of the adjacent edges of the contact discs or plates 28 and 29 are identical and important, having a single turn Archimedes spiral contour with a generation axis disposed concentric with the axis of the drive shaft 17. In other words, the two inner discs 28—28 are set on the shaft 17 in axially spaced identical positions, each disc having an identical shaped single spiral contour, best seen in Fig. 1, with the terminal points of the spiral disposed in the same radial plane and connected by a radially disposed surface or edge.

The outer contact member 29 of each of the discs 24 and 25 is provided with an annular or cylindrical, peripherial contact surface, forming in effect slip rings disposed concentric to the axis of the drive shaft 17, each of the members 29 being formed with a spirally shaped opening therein, identical in shape to the single or Archimedes spiral contour shape of the peripheries of the inner contact members 28, and slightly larger, to receive the inner members 28 in these openings in closely spaced edge to edge relation, insulation 31 being disposed between the inner and outer contact members 28 and 29 of each of the discs 24 and 25, insulation 31a also being disposed between each of the contact disc members 24 and 25 of the rotary switch member 23.

Spaced, relatively insulated, resilient contact members or contact blades 32 and 33 are secured to a bracket arm 34 projecting from the gimbal frame 3, each of the contact blades 32 and 33 having its free end disposed in electrical contact respectively with the peripherial contact surface of one of the contact discs 24 and 25, flexible conductors 35 and 36 connecting these blades, through the terminal block 12, to the plus and minus terminals of the battery 9.

An L-shaped supporting bracket 37, preferably formed of insulating material, is secured to the base plate 1 directly below the rotary contact member 23 and electrical contact arms 38 and 39 are pivoted at spaced points 38' and 39' to the bracket member 37, the upper contact ends of the respective arms being disposed in electrical contacting relation with the respective side contact faces of the discs 24 and 25, along a median line or circle between the inner and outer radial confines of the spirally shaped adjacent edges of the contact elements or plates 28 and 29, when the gimbal frame 3 is in a predetermined level position with respect to the base 1, so that during uniform rotation of the contact member 23 the contact arms 38 and 39 will be in direct contact respectively with each of the inner and outer contact plates 28 and 29 of the rotary contact member 23 during equal time periods.

A reversible servo-motor of any conventional type, such as usually employed to adjust the control surfaces of an airplane is schematically illustrated at 40, the motor having a field coil 41 connected to the battery 9 and a commutator 42 is provided having brushes 43 connected by conductors 44 and 45, through the terminal block 12, to the electric contact arms 38 and 39, contacting the opposite sides of the rotary contact member 23. A coil spring 46 is connected between the two arms 38 and 39, tensioning the arms towards each other and the contact ends thereof into electrical contact with the opposite contact faces of the rotary switch contact or commutator member 23, the ends of the spring 46 being connected to the contact arms in insulated relation by any suitable means such as apertured insulated brackets 46' secured on the contact blades and receiving the opposite ends of the coil spring.

When the main control switch 47 as disclosed in Fig. 2 is closed electrical energy is supplied to the gyroscope rotor through the commutator 6 by the brushes 7 and 8, causing the rotor to revolve at high speed on its spin axis in the gimbal frame and frictional contact between the friction drive disc 21 on the drive shaft 17 and the face 22 of the rotor causes the rotary electrical switch or commutator member 23 to also rotate at high speed. When the gimbal frame 31 is in relatively level position with respect to the supporting base 1 the two electrical contact arms 38 and 39 will be in contact with the inner and outer faces of the contact member 23 along the previously referred to median line between the inner and outer radial limits of the spiral confines of the contact plates 28 and 29 and current will be supplied through the contact blades 32 and 33 from the plus and minus sides of the battery, through the contact brushes 38 and 39 to the conductors 44 and 45 leading to the servo-motor commutator brushes during one-half of each rotation of the rotary switch device 23, current reversal then taking place and current flow will be in the opposite direction during the other half of the rotation, current to the brushes 43 being reversed as the contact arms 38 and 39 pass off of the outer contact plates 29 and onto the inner contact plates 28.

Tilting of the gimbal frame 3 about its axis in one direction or the other relative to the base or support 1 displaces the contact ends of the contact arms 38 and 39 inside or outside of the aforementioned median line or circle around the rotary contact faces causes the contact arms, during each rotation of the contact member 23, to remain in contact with one or the other sets of spiral contact elements 28 or 29 during a relatively greater portion of each rotation of the contact member, and to remain in contact with the other set of spiral contact elements during a correspondingly smaller arc of rotation of a contact member, the ratio or duration of these contacting relations during each rotation of the contact member being determined by the degree of tilt of the gimbal frame 3, the current to the servo-motor 41 being alternately reversed as the contact blades alternately contact the inner and outer contact plates 28 and 29 during rapid rotation of the member 23. Since the servo-motor current is alternately reversed at such a high rate, and as long as the gimbal frame 3 is level relative to the base, the aggregate current flow or current pulses to the servo-motor in each direction is equal and the inertia of the servo-motor armature is not overcome sufficiently to rotate the same appreciably between each of the extremely rapid current reversals.

When the gimbal frame 3 tilts, the aggregate current flow or duration of the current pulses from the battery to the servo-motor in one direction varies with respect to the aggregate current flow to the servo-motor in the opposite direction, causing the servo-motor 44 to rotate in one direction or the other, its rate of rotation depending upon the relative aggregate current variation and the servo-motor armature rotation will continue until the aggregate current flow in the opposite direction is again equalized, due to the leveling action of the gimbal frame 3.

When the support or base 1 is carried by a portable support, such as a small target airplane with the servo-motor 9 operatively connected to the control surfaces of the plane, such as the rudder, aileron or elevator elements, a change in attitude of the aircraft in flight will cause a relative angular displacement between the support 1 and the spin axis of the gyroscope rotor 4, displacing or tilting the gimbal frame 3, causing the contact arms 38 and 39 to shift and engage the sides of the rotary contact member 23 along a line or circle either closer to or farther from the axis of the shaft 17. When the electrical contact is established nearer to the axis of the disc 23 the contact arms will remain in contact with the inner contact plates 28 for a greater portion of each rotation of the contact plates and when the contact arms are relatively displaced farther away from the axis of the shaft 17 the electrical contact relation with the outer contact plates 29 will be greater for each rotation of the rotary contact means 23.

It should be noted that the two contact arms 38 and 39 make contact with the sides of the rotary contact member 23 substantially in a plane which passes through the axis of rotation of the contact member and the axis of the shaft 17, this plane being perpendicular to an intersecting plane passing through the gimbal frame tilt axis and the axes of the shaft 17. This is important since it disposes the direction of the application of the frictional torque between the contact arms 38 and 39 and the contact surfaces of the rotary contact or switch member 23 in the gimbal frame 3 in a plane passing substantially through the gimbal frame tilt axis, the frictional contact of the ends of the arms 38 and 39 with the rotary member 23 therefore has no tendency to apply rotative torque to the gimbal frame, or cause precession of the gyroscope rotor spin axis and the resulting tilt of the gimbal frame 3.

Referring now to Figs. 5 and 6 of the drawings, illustrating a slightly modified form of rotary contact member which may be used in place of the rotary contact or switch member 23 disclosed in the construction illustrated in Figs. 1 to 5, the reference numeral 17' indicates a drive shaft similar to the drive shaft 17, adapted to be mounted and driven by an electrical gyroscope rotor in a manner similar to the previously described embodiment of my invention. The structural details of the rotor 4, gimbal frame 3 and the electrical connections to the rotor have not been illustrated in detail in Figs. 5 and 6 since these elements would be the same or similar to those already illustrated and described.

A contact disc 23' is secured to the outer end of the shaft 17' and is formed of insulating material, having a single or composite contact face 26' like one of the contact faces of the contact member 23 and comprises an inner electrical contact plate 48, similar in contour to the inner contact plates 28—28 illustrated in Figs. 1 to 4 and has an Archimedes spiral peripherial contour with a generation axis that is coincident with the axis of the drive shaft 17'. Surrounding this inner spiral contact plate 48, in closely spaced insulated relation thereto, is an outer contact plate 49 having a similarly shaped Archimedes spiral opening formed therein, receiving the inner contact plate 48 with the contact surfaces of both of the plates in a single plane perpendicular to the rotary axis of the drive shaft 17'. Concentric slip rings 50 and 51 are secured to the opposite face of the rotor disc commutator member 23', in electrical contact respectively with the spiral inner and outer contact plates 48 and 49.

Relatively insulated, electrical contact blades 52 and 53 are secured on the gimbal frame 3' in spaced relation to each other with their free ends in electrical contact respectively with the slip rings 50 and 51, these contact blades being preferably connected by flexible conductors to the reversing field coils of a reversible electric servo-motor 54, current being supplied to the armature of the motor 54 from a battery 56 through the brushes 55. A single resilient contact arm 57 is secured to the base or support for the gimbal frame with its free end in electrical contact with the contact face 28' along a median line or circle between the inner and outer radial confines of the spiral contour of the contact plate 48 when the gimbal frame 23' is relatively level on the supporting base. The contact point between the end of the arm 57 and the rotary disc 23' is disposed in a plane passing through the rotary axis of the disc 23' and the shaft 17 and perpendicular to an intersecting plane passing through the tilt axis of the gimbal frame and the rotary axis of the rotary disc member 23', directing the thrust caused by the frictional contact between the rotary disc member 23' and the contact arm 57 in a direction passing through the gimbal frame tilt axis to prevent this thrust from causing precession of the gyroscope rotor spin axis or tilt of the gimbal frame.

Tilting displacement of the gimbal frame 3' adjusts the relative position of the contact disc 23' with respect to the contact arm 57 and the contacting relation of the contact arm with respect to the aforementioned median line between the spiral contour portions of the inner and outer contact plates 48 and 49, so as to vary the relative arc of contact between the inner and outer spiral contact plates 48 and 49 in a predetermined ratio to the relative tilt of the gimbal frame during uniform rotation of the rotary contact member 23'. The aggregate length of time, during the high speed rotation of the contact member 23' by the gyroscope rotor, when the electrical current source is connected to one of the field coils of the reversible motor 54, relative to the aggregate length of time when the reversing field coil is connected to the electrical source by the rotary switch device 23' determines the direction and rate of rotation of the motor 54. This motor 54, like the motor 40 may be of any conventional type and may be connected to an aircraft controlled surface for controlling the attitude of an aircraft in flight in relation to the position or angular adjustment of the spin axis of the gyroscope rotor and corresponding tilt of the gimbal frame.

Figs. 7 and 8 illustrate a further modification of my improved rotary switch control device in which the reference numeral 60 indicates a support or base member similar to the base member 1 in Figs. 1 to 6, and a U-shaped gimbal supporting bracket 61 is secured to the base member 60 in any suitable manner. The bracket 61 is provided with spaced upstanding arms or standards 62—62 carrying axially aligned trunnions 63—63. A gimbal frame 64 is mounted on the trunnions 63—63 for free tilting movements within prescribed tilting limits, any suitable stop means being provided for limiting the tilting action, such as the stop plate 14 described in connection with Fig. 1. The gimbal frame 64 is connected, directly below its tilting center, to one of the standards 62, by a leveling or rate of tilt determining spring 65. An electrical driven gyroscope is mounted between the opposite side bars of the gimbal frame 64 with its spin axis disposed in a plane passing through the gimbal tilt axis and is perpendicular to the gimbal tilt axis. This gyroscope comprises a stator 67 which is carried by a post 68 fixed in one of the gimbal frame side bars, the gyroscope rotor 69 having a suitable bearing support or journal sleeve 70 projecting therefrom journalled on a journal post 71 secured to the other gimbal frame side bar, opposite to and in axial alignment with the post 68. Two axially spaced sleeves or electrical contact ring members 72 and 73 having adjacent complementary spirally formed edge portions, are disposed over the periphery of the rotor 69, a thin sleeve 74 of insulating material being interposed between the two sleeve contact members 72 and 73 and the periphery of the rotor 69, the adjacent complementary spirally shaped edges of the two sleeve members 72 and 73 being also separated by insulating material as shown in Fig. 7.

The contours of the complementary spirally shaped adjacent edges 72a and 73a of the sleeves are that of similar single turn Archimedes spirals, and are similar to the spiral contour edges of the complementary spiral contact plates 28 and 29 or 48 and 49 in the previously described forms of the invention, except that the spiral is laid out around a cylindrical surface in the present form instead of on a flat or disc shaped surface as in the other form. A median line which passes equally through both of the complemental spiral portions in this sleeve type of contact member is disposed in a true plane which passes through the gimbal tilt axis perpendicular to the rotor spin axis.

With the gimbal frame 64 disposed in a level position with respect to the base 60, a single, light flexible contact blade or arm 75 is secured to the base and bracket 61 and insulated therefrom by a suitable insulating material 76, the free or contact end 75a of the blade 75 being disposed in electrical contact with the laterally curved periphery of the complementary contact sleeves 72 and 73 along the said median line which passes equally through the complementary spiral contour portions of the two sleeves, the periphery of the two sleeves 72 and 73 being curved between their outside edges on an arc having its center at the intersection of the rotor spin axis and the gimbal frame tilt axis, so that tilting displacement of the gimbal frame does not disturb or vary the degree of contacting relation between the contact blade 75 and the peripherial contact surfaces of the two contact sleeves 72 and 73.

When the gimbal frame 64 tilts in one direction or the other relative to its supporting bracket 61 the relative contacting relation between the two complemental spiral contour portions of the sleeve members 72 and 73 and the single contact blade 75 on the base changes. Tilting of the spin axis of the rotor displaces the medial line or plane so that during each rotation the duration or arc of contact between the respective sleeve members is varied, and if the gimbal frame tilts sufficiently, the contact blade 75 will remain in contact with one of the contact sleeves during the continued rotation of the sleeve members. Up to this degree of tilt of the gimbal frame, however, the relative tilting angle determines the relative rotative angles of the contact sleeves during which the contact blade 75 will be in electrical contact with each of the respective sleeve members 72 and 73. Resilient contact blades 76 and 77 are secured to one end of the gimbal frame 64 in insulated relation to each other and to the gimbal frame, the free end portions of these contact blades being disposed in electrical contact respectively with the sleeve members 72 and 73 at points adjacent their outer edges as clearly disclosed in Fig. 7 of the drawings.

The reference numeral 78 schematically illustrates a servo-motor actuating device which is similar to the motor disclosed in Fig. 6, separate reversing field coils 79 and 80 being provided for causing rotation of the motor armature 81 in one direction or the other, depending upon which one of the field coils is energized. Flexible conductors 82 and 83 connect the secured ends of the contact blades 77 and 78 to one end terminal of each of the respective field coils while the opposite end terminals of the coils are connected through a common conductor 84 to one terminal of a battery 85, and to one of the armature commutator brushes 86, the other commutator brush being directly connected to the other side of the battery 85 by a conductor 87. An electrical conductor 88 leads from the last mentioned terminal of the battery 85 and is connected to the single contact blade 75. Flexible conductors 89 and 90 are disclosed for supplying electrical energy from any desired electrical source to the gyroscope rotor 69 to rotate the same within the gimbal frame. In describing the operation, assuming that the rotor 69 is rotating at high speed, with the gimbal frame and rotor spin axis level or parallel to the base 60, the contact blade 75 alternately contacts the spiral portions of the two contact sleeves 72 and 73 during equal arcs of rotation of the rotor, alternately connecting the battery 85 with each of the field coils 79 and 80, during each rotation of the rotor, the contact being made along the previously mentioned median line, causing very rapid energizing electrical impulses to be alternately applied to the two motor field coils 79 and 80. These electrical impulses are individually too short to cause any substantial rotation of the armature in one direction or the other due to the inertia of the motor armature and the rapid subsequent energizing of the other field coil, but when the gimbal frame tilts in one direction or the other the contact blade 75 remains in contact with one of the contact sleeve members throughout a greater arc of each rotation of the rotor while the other sleeve member remains in contact throughout a correspondingly smaller arc of rotation of the rotor member, and due to the rapid rotation of the rotor, the aggregate length of time that one of the field coils is energized by the battery varies with respect to the aggregate time that the other field coil is energized, and therefore the aggregate current flow through one of the motor field coils during any prolonged definite time period as compared to the aggregate current flow through the other motor field coil, determines the direction and rate of rotation of the motor armature 81, the rate of rotation of the armature being in a predetermined ratio to the degree of tilt of the gimbal frame.

While I have described my invention in conjunction with several specific embodiments, for purposes of illustration, what I claim as new and desire to secure by Letters Patent, is:

1. In a rotary electrical switch device, a support, gimbal means tiltably carried on said support, rotary switch means journalled on said gimbal means to rotate on an axis parallel to the tilt axis of said gimbal means comprising adjacent complemental inner and outer concentric contact elements having relatively insulated contact surfaces disposed in the same plane perpendicular to the rotary axis of the rotary switch means, said inner contact element having an Archimedes spiral shaped peripherial contour, said outer contact element having an opening formed therein of similar Archimedes spiral configuration to receive the inner contact element therein with the edge of the opening disposed in insulated closely spaced relation to the periphery of said inner contact element, two relatively insulated electrical contact elements carried by said gimbal means, each contact element in contact with one of said inner and outer concentric contact elements, electrical contact means carried by said support for contacting relation with the contact surfaces of the inner and outer concentric contact elements of the rotary switch means on a medial line intermediate the radial confines of the Archimedes spiral of the inner contact element when the gimbal means is in a predetermined position on the support, means for rotating said rotary switch means to alternately dispose the support carried contact means in electrical contact with the inner and outer concentric contact elements during equal arcs of rotation of the switch means to alternately establish alternate electrical circuit closing relation between the support carried contact means and the inner and outer contact elements through the said relatively insulated gimbal carried electrical contact means during rotation of said switch means, gyroscope means for tilting of the gimbal means relative to the support to vary the duration of the contacting relation between the support carried contact means and the inner and outer contact elements during each rotation of the rotary switch means in predetermined ratio to the tilt of said gimbal means relative to the support.

2. In a circuit controlling switch device, a relatively fixed support, an electrical contact member carried by said support, a gimbal tiltably carried by said support, a gyroscope rotor journalled in said gimbal having its spin axis normal to the tilt axis of the gimbal, circuit closing switch means rotatably mounted in said gimbal by said gyroscope rotor comprising contiguous concentric relatively insulated complemental spiral shaped contact surfaces disposed for contacting engagement with said contact member along a median line through said adjacent complemental spiral shaped surfaces, constructed and arranged so that tilting of the gimbal frame varies the contacting position of the electrical contact member relative to said medial line during uniform rotation of the switch means to vary the duration of the contacting relation between one of the contact surfaces and the electrical contact member relative to the duration of the contacting relation between the electrical contact member and the other contact surface in predetermined ratio to the degree of tilt of the gimbal, and relatively insulated electrical contact means on said gimbal in contact with each of the contact surfaces of the switch means.

3. In an aircraft flight attitude controlling instrument, a support adapted to be carried by the aircraft, a gimbal tiltably journalled on said support, a gyroscope rotor journalled on said gimbal to rotate about an axis normal to the gimbal tilt axis, rotary circuit closing switch means journalled on said gimbal to rotate about an offset axis parallel to the tilt axis of the gimbal, means between the rotary switch means and the gyroscope rotor for rotating said switch means, said switch means having annular contiguous concentric contact surfaces disposed substantially perpendicular to the rotary axis of the switch means comprising an outer annular contact plate having a single turn spiral contour opening therein with a spiral generation axis coincident with the rotary axis of the switch means and a relatively insulated similarly shaped single turn spiral contour contact plate disposed in said spiral opening with the peripherial edge thereof in contiguous insulated relation to the edge of the opening in the outer contact plate, electrical contact means carried by the support in contact with said contiguous contact face along a median line substantially midway between the inner and outer radial confines of the spiral shaped opening when said gimbal is disposed relatively level on the support, whereby rotation of the switch means by said rotor relative to the electrical contact means maintains said support carried contact means alternately in contact with each of said contact plates for an equal time duration and tilting of said gimbal adjusts the relative position of the contact plates to said support carried contact means, to vary the duration of the contacting relation of one of the spiral contact plates with said support carried contact means relative to the duration of the contacting relation between the other spiral contact plate and the support carried contact means in predetermined ratio to the degree of tilt of the gimbal, and an electrical circuit connection to each of said contact plates.

4. In a high speed electrical circuit changing switch device, a support, a gimbal tiltably carried by said support having a predetermined relatively level position, a gyroscope rotor journalled in said gimbal to rotate about an axis transverse to the gimbal tilt axis, rotary circuit changing switch means disposed on said gimbal in driving relation with said rotor comprising a pair of adjacent relatively insulated contact elements each having a contact surface disposed for rotation about a common fixed axis relative to said gimbal, said contact elements having complemental single turn spiral shaped adjacent edges disposed in closely spaced contiguous relatively insulated relation, yieldable electrical circuit conductor members carried by said gimbal in contacting relation with each of said contact elements, an electrical circuit conductor member fixed on said support in contact relation with said contact surfaces on a median line substantially midway through the aforesaid complemental single spiral shaped surfaces when the gimbal is in said level position on the support, constructed and arranged so that the single contact member alternately contacts each complemental single spiral shaped contact element throughout a substantially equal arc of rotation of the contact surface when the gimbal is level relative to the support and predetermined tilt of the gimbal relative to the support relatively displaces said conductor member relative to the medial line to cause the contact member to remain in contact with one of said contact faces during a predetermined greater arc of rotation of the contact surface and to contact the other contact face during a predetermined smaller arc of rotation of the contact surface.

5. In a rotary electric switch device, a fixed support, a tiltable support carried thereby, a pair of relatively insulated contact plates rotatably carried by said tiltable support, having adjacent closely spaced edges of complemental spiral contour forming a contiguous electrical contact surface, means on the tiltable support for rotating said contact plates about a common axis relative to the tiltable support to dispose a median line passing through the adjacent complemental spiral contour portions at a predetermined radius from said common axis, relatively stationary electrical contact member means on the fixed support disposed in contact with said contact surface along said median line when said contact surface is uniformly rotated with the tiltable support in a predetermined position relative to the fixed support to alternately contact each contact plate for an equal length of time, said rotary contact plates constructed and arranged so that relative tilting of the tiltable support adjusts the contacting position between the contact member on the fixed support and said contact surface with respect to the said median line to vary the relative length of time of the contact between the contact member and each of said contact plates during uniform rotation of the contact surface, and relatively insulated electrical conductor means disposed on the tiltable support in contact with each of said contact plates.

6. In a rotary switch device, a support, a gimbal tiltably carried by said support, a pair of relatively insulated contact plates having contiguous contact surfaces with adjacent closely spaced edges of complemental single turn spiral contours constituting a rotary electrical circuit switching contact surface, means for rotating said contact plates in a plane at right angles to the gimbal tilt axis and about an axis offset and parallel to the gimbal tilt axis, to dispose a median line through said adjacent complemental spiral contour edges at a predetermined radius from said offset axis, gyroscope rotor means journalled on said gimbal for tilting said gimbal and rotating said contact plates, electrical conductor means carried by said support in contact with said contact surface along said median line when said gimbal is in a predetermined level position relative to the support and said contact surface is rotating uniformly, to alternately contact each contact plate for an equal length of time, whereby tilting of the gimbal adjusts the relative contacting relation between said electrical conductor means and said contact surface to vary the relative duration of the contact between each contact plate and the electrical conductor means in predetermined ratio to the tilt of said gimbal, and relatively insulated electrical conductor means on said gimbal in contact with each of said electrical contact plates.

7. In a high speed current reversing switch device, a support, a gimbal frame tiltable thereon about a horizontal axis, a gyroscope rotor journalled in said gimbal frame about a horizontal axis normal to the gimbal frame tilt axis, a drive shaft journalled in said gimbal frame parallel and eccentric to said gimbal frame tilt axis, friction drive means between the shaft and the rotor for rotating the shaft by the rotor, an annular current reversing commutator means comprising a pair of contact discs fixed on said shaft in adjacent insulated relation to each other having parallel side contact surfaces facing away from each other, each of said contact discs including an inner contact member having a single turn spiral peripherial contour, and an outer relatively insulated concentric contact member having a single turn spiral contour opening formed therein receiving said inner contact member therein in closely spaced insulated relation, electrical conductor means between the inner contact member of each disc and the outer contact member of the other disc, relatively insulated electrical circuit conductor means carried by said gimbal frame in contact with each of said outer contact discs, spaced yieldable electrical circuit conductor means carried by the support in contacting relation with the contact surfaces of said contact discs midway between the maximum and minimum radial limits of the periphery of the inner contact members in a plane passing through the said drive shaft axis perpendicular to a plane passing through the rotor spin axis and the drive shaft axis when the gimbal frame is level relatively to the support, whereby tilting of the gimbal frame displaces the position contact surfaces of the contact discs relative to the yieldable circuit conductor means, to vary the relative durations of the alternate contacting relation between the yieldable conductor means and the inner and outer contact members of the contact discs in predetermined ratio to the tilt of the gimbal frame.

8. In an aircraft flight control electrical circuit reversing switch device, a support, a gimbal carried by said support to tilt about a horizontal axis, an electrically driven gyroscope rotor journalled on said gimbal for rotation about a substantially horizontal axis normal to said gimbal tilt axis, a drive shaft journalled on said gimbal in offset parallel relation to the gimbal tilt axis, drive means fixed on said shaft in driving relation with said rotor, annular rotary current reversing switch means fixed on said shaft comprising a pair of relatively insulated side-by-side identical electrical circuit reversing contact discs having spaced parallel contact surfaces disposed in planes normal to the said drive shaft axis, each contact disc comprising inner and outer concentric contact plates, the inner plate having a single turn spiral peripherial contour with a generation axis coincident with the drive shaft axis and the outer contact plate having a single turn spiral contour opening therein receiving said inner plate with the spiral peripherial contour thereof in closely spaced relation to the edge of said spiral opening, insulation between said inner and outer contact plates, electrical conductor means connected between the outer plate of each disc and the inner plate of the other disc, spaced relatively insulated electrical conductor means on said gimbal in contact with the periphery of each outer plate and connected in an electrical control circuit, spaced relatively insulated electrical contact means secured on said support and connected in said circuit in contacting relation with the opposite sides of said contact discs at opposite contact points in a plane parallel to said gimbal tilt axis and perpendicular to said rotor spin axis and substantially at right angles to a plane passing through said drive shaft axis and said gimbal tilt axis, said contact points being along a medial line between the inner and outer radial limits of the spiral contours of the adjacent edges of the inner and outer contact plates when said gimbal is level, whereby rotation of the rotary current reversing switch means by the rotor disposes said inner and outer contact plates alternately in contact with each of said electrical contact means during equal arcs of rotation of the drive shaft, and tilting displacement of said gimbal varies the relative duration of the contacting relation between said inner and outer contact plates during equal successive arcs of rotation of said drive shaft in predetermined ratio to the degree of tilt of said gimbal.

9. In a current reversing rotary switch device, a support, annular rotary contact means carried by said support for relative bodily displacement about a fixed center on said support, said contact means comprising spaced adjacent identical parallel contact discs having oppositely facing electrical contact surfaces, means for insulating said discs from each other, gyroscope means for rotating said rotary contact means at relatively high speed and bodily displacing said contact means incident to movement of the support, said discs each comprising concentric inner and outer relatively insulated contact plates, said inner plates each having a single turn spiral contour periphery, said outer plates each having a circular periphery and a central opening formed therein having a spiral contour similar to the spiral peripherial contour of said inner plates, receiving the inner plate therein in closely spaced relation, insulation between said inner and outer plates, an electrical connection between the outer plate of each contact disc and the inner plate of the other contact disc, electrical circuit conductor means disposed in contact with the periphery of each of outer contact discs, spaced yieldable relatively insulated electrical conductor contact means fixed on said support at opposite sides of the rotary contact means in contact with the contact surfaces thereof in a plane passing substantially through the rotary axis of said rotary contact means at right angles to an intersecting plane passing through the rotary axis of the contact means and the aforesaid fixed center on the support to contact said contact discs on a median line between the minimum and maximum radial distances from the peripherial spiral contour portions of the inner contact members to the rotary axis of the contact means whereby rotation of the contact means disposes said electrical conductor contact means alternately in contact with said inner and outer contact plates during equal arcs of rotation of said contact means and relative bodily displacement of said contact means about said fixed center adjusts said contacting relation between said electrical conductor contact means and said contact surfaces to vary the duration of the alternate contacting relation thereof with said inner and outer contact plates of the contact discs in direct ratio to the bodily displacement between said rotary contact means and the electrical conductor contact means.

10. In a gyroscope controlled rotary switch device, a support, a gimbal frame tiltable about a fixed support axis, a gyroscope rotor journalled in said gimbal frame on an axis normal to said gimbal frame tilt axis, contiguous relatively insulated contact sleeves disposed around the periphery of the rotor in concentric relation to the rotor spin axis, having closely spaced adjacent edges of complemental single turn spiral contour with a medial plane therebetween extending through the gimbal frame tilt axis perpendicular to the gyroscope rotor spin axis, spaced relatively insulated yieldable electrical contact means fixed on the gimbal frame at opposite sides of the median line in contact with each of said contact sleeves, and a relatively insulated yieldable contact member fixed on the support in contact with said contact sleeves on said medial line when said gimbal frame is level relative to the support, whereby said contact member alternatively contacts each of said contact sleeves for equal time durations during uniform rotation of the rotor, and relative tilting displacement of the rotor spin axis and the gimbal frame adjusts the contacting relation between the contact member and said contact sleeves relative to the median plane to vary the contact duration between said sleeves and the contact member during uniform rotation of the sleeves in a predetermined ratio to the tilt of the gimbal frame.

11. In a rotary electrical current reversing switch device, a support, a gimbal frame carried by said support to tilt about an axis fixed relative to the support, a gyroscope rotor journalled in said gimbal frame on an axis transverse to said gimbal frame tilt axis, a laterally offset drive shaft journalled in said gimbal frame parallel to the gimbal frame tilt axis, means between said drive shaft and rotor for rotating the shaft from the rotor, annular circuit reversing contact means fixed on said drive shaft comprising relatively insulated identical contact disc members having spaced contact faces disposed in axially spaced parallel planes normal to the axis of said shaft, said contact members each comprising inner and outer relatively insulated contact plates, said inner plates having identical single turn spiral peripherial contours with a generation axes coincident with the shaft axis, said outer contact plates each having a single turn spiral contour opening formed therein receiving one of the inner plates therein in closely spaced relation to dispose the contact faces of said plates of each of the contact disc members in the same plane, an electrical connection between the outer contact plate of each contact disc member and the inner contact plate of the other contact disc member, spaced electrical conductor members carried by said gimbal frame in contact respectively with each of said outer plates and adapted to be connected in an electrical control circuit, spaced yieldable electrical contact members fixed on said support and adapted to be connected in said control circuit, each disposed in electrical contact with the contact face of one of said contact disc members on a medial line extending between the inner and outer plate spiral contours during rotation of the contact disc members whereby said spaced yieldable electrical contact members are alternately brought into contact with said inner and outer spiral contour contact plates for equal time periods during uniform rotation of the circuit reversing contact means and tilting of the gimbal frame displaces said contact means relative to the inner and outer plates to vary the relative length of time of the contact between the spaced contacts and the inner and outer spiral contour plates in a predetermined ratio to the degree of tilt of said gimbal frame.

12. In a gyroscopic controlled rotary electrical switch device, a support, a gimbal frame carried by the support to tilt about a fixed axis on the support, a gyroscope rotor journalled on said gimbal frame for rotation about an axis normal to the gimbal frame tilt axis, annular electrical switch contact means rotatably carried by the gimbal frame on an axis fixed relative to the gimbal frame, said switch contact means comprising inner and outer relatively insulated contact plates each having side contact faces disposed in a common plane perpendicular to said switch contact means rotary axis, said inner plate having a single turn spiral contour periphery with a spiral generation axis coincident with said switch contact means rotary axis, said outer contact plate having a substantially central opening formed therein having a contour similar to the peripherial contour of the inner contact plates to receive the inner contact plate therein in closely spaced relation to the edge of the outer contact plate spiral opening, spaced annular contact slip rings concentrically carried by said switch contact means and connected to each of said inner and outer contact plates to rotate therewith, relatively insulated electrical conductor means fixed to said gimbal frame in yieldable contacting relation with each of said annular contact rings adapted to be connected to an energizing circuit conductor, a single yieldable electrical conductor fixed on said support in contacting relation with the side contact faces of said inner and outer contact plates substantially along a circular medial line between the inner and outer radial limits of the spiral peripherial contour of the inner contact plate during rotation thereof when said gimbal frame is in a predetermined relatively level position to the support, for alternately engaging each of said contact plates for an equal time duration during uniform rotation of the switch contact means by the gyroscope rotor and varying for the relative time duration of said contacting relation between said inner and outer contact plates incident to tilt of the gimbal frame and displacement of said single conductor means relative to the said medial line in a predetermined ratio to the tilt of said gimbal frame.

13. In a rotary electrical switch device, a fixed support, yieldable electrical contact blade means carried by the fixed support, a tiltable support carried by said fixed support, circuit closing switch means rotatably carried by said tiltable support for tilting displacement relative to said electrical contact blade means, said rotatably carried switch means having an electrical contact surface rotatable in contacting relation with said fixed support carried yieldable contact blade means said rotatably carried switch means having an electrical contact surface in contacting relation with said fixed support carried contact blade means comprising relatively insulated contiguous rotary electrical contact elements each having adjacent complemental spiral contour shaped edges, a pair of relatively insulated electrical contact blades carried by said tiltable support, each contact blade being in contact with one of said contiguous rotary electrical contact elements, means on said tiltable support for rotating said rotary electrical circuit closing switch means, constructed and arranged so that tilting displacement of said tiltable support and rotary circuit closing switch means relative to the fixed support causes relative displacement between the fixed support carried yieldable contact blade means and the contiguous electrical rotary contact elements during rotation of the rotary electrical contact surface, to vary the relative duration of the contacting relation between the fixed support carried yieldable contact blade means and one of the rotary spiral contour shaped contact elements relative to the duration of the contacting relation between the fixed support carried yieldable contact blade means and the other rotary spiral contour shaped contact element.

14. In a rotary switch device of the class described, a fixed support, a relatively movable support carried thereby, single turn spiral contact means rotatably carried by said movable support and rotatable about the generation axis of the spiral, electrical contact means on the fixed support disposed in contacting relation with the rotatable spiral contact means along a median line between the maximum and minimum radial confines of the spiral when the relatively movable support is in a predetermined position relative to the fixed support, separate electrical contact means carried by the movable support, disposed in electrical contact with said single turn rotatable spiral contact means, electrically driven gyroscope means carried by the movable support for stabilizing the same relative to the fixed support and the fixed support carried contact means, for varying the contacting relation relative to said median line during rotation of the spiral contact means to vary the duration of the contacting relation between said spiral contact means and the fixed support carried contact means in predetermined ratio to the displacement between the first mentioned contact means and the median line, and driving means between the gyroscope means and said spiral contact means for rotating the spiral contact means relative to the fixed support carried contact means.

15. Apparatus as claimed in claim 14 in which the relatively movable support is a gimbal frame and the gyroscope rotor is carried by the gimbal frame and has its spin axis normal to the gimbal frame tilt axis and includes friction driving means between the rotor and the spiral contact means for rotating the spiral contact means from the rotor.

THEODORE E. SIERER, Jr.

REFERENCES CITED

The following references are of record in the file of this patent:

UNITED STATES PATENTS

| Number | Name | Date |
|---|---|---|
| 1,015,837 | Regnard | Jan. 30, 1912 |
| 1,365,090 | Clapp | Jan. 11, 1921 |
| 1,642,087 | Rosenbaum | Sept. 13, 1927 |
| 1,814,424 | Barr | July 14, 1931 |
| 2,158,181 | Goddard | May 16, 1939 |
| 2,368,644 | Curry, Jr. | Feb. 6, 1945 |
| 2,389,158 | Lane et al. | Nov. 20, 1945 |

FOREIGN PATENTS

| Number | Country | Date |
|---|---|---|
| 96,671 | Austria | Apr. 25, 1924 |